United States Patent [19]

Rando

[11] Patent Number: 5,610,711
[45] Date of Patent: Mar. 11, 1997

[54] REMOTE POINTING SYSTEM FOR A SELF-LEVELING LASER INSTRUMENT

[75] Inventor: Joseph F. Rando, Los Altos Hills, Calif.

[73] Assignee: Levelite Technology Inc., Mountain View, Calif.

[21] Appl. No.: 576,911

[22] Filed: Dec. 22, 1995

[51] Int. Cl.⁶ .......................... G01B 11/26; G01C 11/26; G01C 5/00; F41G 1/02
[52] U.S. Cl. .................. 356/247; 356/139.1; 356/141.1; 356/138; 33/1 CC; 33/1 DD; 33/290; 33/273; 33/252
[58] Field of Search .................... 356/247, 248, 356/249, 250, 152, 172, 141, 4, 138; 33/1 CC, 1 DD, 290, 247, 248, 252, 273, 295; 250/203 R

[56] References Cited

U.S. PATENT DOCUMENTS

| | | | |
|---|---|---|---|
| 3,588,249 | 6/1971 | Studebaker | 356/4 |
| 3,684,381 | 8/1972 | Zoot | 356/138 |
| 3,790,277 | 2/1974 | Hogan | 356/152 |
| 3,807,869 | 8/1974 | Hartley | 356/149 |
| 3,856,409 | 12/1974 | Cindrich et al. | 356/138 |
| 3,897,637 | 8/1975 | Genho | 33/227 |
| 3,936,197 | 2/1976 | Aldrink | 356/250 |
| 4,043,679 | 8/1977 | George et al. | 356/249 |
| 4,053,238 | 10/1977 | George et al. | 356/249 |
| 4,062,634 | 12/1977 | Rando et al. | 356/248 |
| 4,119,382 | 10/1978 | George et al. | 356/249 |
| 4,221,483 | 9/1980 | Rando | 356/350 |
| 4,333,242 | 6/1982 | Genho, Sr. | 33/227 |
| 4,679,937 | 7/1987 | Cain et al. | 356/138 |
| 4,767,208 | 8/1988 | Cain et al. | 356/138 |
| 4,781,457 | 11/1988 | Hirano et al. | 356/250 |
| 4,852,265 | 8/1989 | Rando et al. | 33/227 |
| 4,907,879 | 3/1990 | Webb | 356/141 |
| 4,912,851 | 4/1990 | Rando et al. | 33/227 |
| 4,993,161 | 2/1991 | Borkovitz | 33/291 |
| 5,075,977 | 12/1991 | Rando | 33/227 |
| 5,141,307 | 8/1992 | Bennett | 356/1 |
| 5,144,486 | 9/1992 | Hart | 359/629 |
| 5,144,487 | 9/1992 | Hersey | 359/629 |
| 5,208,438 | 5/1994 | Underberg | 219/121 |
| 5,287,365 | 2/1994 | Nielsen et al. | 372/9 |
| 5,367,458 | 11/1994 | Roberts et al. | 364/424 |
| 5,421,096 | 6/1995 | Ross | 33/290 |

*Primary Examiner*—Frank Gonzalez
*Assistant Examiner*—Michael P. Stafira
*Attorney, Agent, or Firm*—Thomas M. Freiburger

[57] ABSTRACT

An apparatus for use with a compact self-leveling construction laser for the purpose of allowing the user to remotely call or page the measurement beam to his location using a retroreflector. The apparatus uses an auxiliary plumb beam provided by the construction laser for scanning the job site in search of the cooperative reflector. The invention consists of a construction laser, motor driven turntable assembly to which the construction laser is attached and a cooperative reflector carried by the operator.

24 Claims, 7 Drawing Sheets

REMOTE POINTING SYSTEM FOR A SELF-LEVELING LASER INSTRUMENT

BACKGROUND OF THE INVENTION

This invention relates to laser tools used in construction measurement and the use of laser beams to indicate reference lines and planes. In particular the invention relates to the remote pointing of a level laser beam toward an operator in the field. The invention also relates to pointing two reference laser beams which are at 90 degrees to each other in the horizontal planes as are commonly required in the construction industry. Laser instruments of this type project a beam or beams of laser light which indicate points along a level line. The invention consists of a self-leveling laser with a wide self-leveling range, a remote-controlled turntable, and a reflector carried by the operator used to call or page a reference beam to the operator.

In the simplest case, a laser projector is mounted to a carpenter's level and projects a laser beam parallel to the axis of the level. The spot produced by the beam striking a surface along the projected line indicates a point on the level reference line. This basic laser tool is described in Genho U.S. Pat. No. 3,897,637. In this case, the carpenter's level must be adjusted to level using the level vials on the instrument. In Rando U.S. Pat. No. 4,852,265, U.S. Pat. Nos. 4,912,851, 5,144,487 and 5,075,977, a self-leveling laser instrument is described which projects a level laser beam despite a tilt of the housing. A reference plane can be generated by rotating the self-level laser instrument about a point on a substantially horizontal surface. Since the height of the self-leveling laser instrument has not changed substantially during the rotation, every projected line is an element in the level plane.

Today, it is most common to generate the laser reference plane by projecting the laser beam into a rotating pentaprism. This technique is described in Studebaker U.S. Pat. No. 3,588,249, Aldrink U.S. Pat. No. 3,936,197, Rando U.S. Pat. No. 4,062,634, Rando U.S. Pat. No. 4,221,483, Borkovitz U.S. Pat. No. 4,993,161 and others. In all cases, the housing is fixed and a beam is rotated to generate a plane. Normally these instruments are mounted on tripods and require setup by the operator. The tripods are generally heavy and clumsy to carry and set up. Most of the self-leveling laser instruments require an adjustment base under the laser or on the instrument to adjust the base of the instrument to be within the self-leveling range. Most of these instruments have a self-leveling range of only 15 minutes of arc requiring some time to set up. This set-up time is costly for the operator. However, instruments with a self-leveling range of several degrees do not require adjustments for leveling and thus are more productive to use. Generally speaking, a rotating beam is too weak to see and a sensitive detector is needed. To locate the beam, the detector is manually raised and lowered in the beam to locate center, for establishing an elevation. A visual display on the detector or an audio tone indicates the beam position to the user.

The goal of the instruments described above and also of the present invention is to mark points at the same elevation or along a given line. When the beam is not rotating, the center of the spot may be marked with a pencil. When a detector is used, a reference notch on the detector guides the pencil mark.

It is sometimes common to point a stationary laser beam with the same motor which is normally used to rotate the beam continuously. In this way, the operator can mark desired locations within the job site without using an expensive detector. When the spot is visible on the wall, it is quickly and easily marked with a pencil. The disadvantage of this system is that the operator must move the beam to a new location for each point. This means he must walk back and forth between the instrument laser and the point to be marked. This is very time-consuming.

In the prior art shown in FIG. 1, a level plane may be established by positioning a self-leveling laser instrument 2 over a point and rotating the instrument as needed to mark points in the plane. Two beams 6 and 8 are projected from the housing at 90 degrees to each other. In this case, the operator must walk back and forth between the laser instrument and marking location to make each mark. This is time-consuming. The laser instrument is used to establish a building corner or other square feature used in construction.

In the laser marking system 20 shown in FIG. 2, a laser beam 22a may be moved to sweep to locations 22b–22d. Such pointing can be done manually or with a remote control device (not shown). The laser beam is rotated internally in the instrument, via a pentaprism 28 mounted on a housing 24 supported by a tripod 26.

In an alternate method of eliminating the detector, the visibility of a rotating laser is enhanced by scanning the level beam back and forth using the same motor which normally rotates the pentaprism. This product is marketed in the U.S. by Topcon. In this case a special target 30 with two reflecting stripes 32 and 34 is used. When a rotating laser beam 36 strikes the stripes, a signal is received within the laser instrument which reverses the motor drive current. The beam then scans repeatedly across the two stripes, which concentrates the beam making it more visible. Therefore the user sees the beam by eye instead of detecting it via electronic detector. The user can then mark an elevation or set an item at that elevation.

In the system of Hogan U.S. Pat. No. 3,790,277, shown in FIG. 4, a tripod-mounted laser instrument 40 rotates a measurement beam 42 by rotating the entire laser using a motor. An infrared transmitter 44 on a grade rod 46 emits a multidirectional light beam 48 which is received at the laser instrument 40. A receiver in the laser instrument detects the light emitted using a special directionally-sensitive receiver. In normal operation the motor rotates the laser instrument 360 degrees until the infrared signal is detected. The instrument then locks onto the infrared beam and tracks the signal as the operator moves about the field.

The instruments of the prior art are large and expensive. In addition they lack the versatility of a hand-carryable, self-leveling instrument, useful separately.

SUMMARY OF THE INVENTION

The invention encompasses an apparatus for remotely directing the rotation of a self-leveling laser beam instrument about a substantially vertical axis to facilitate its use in establishing elements of a level reference plane used in construction measurement. The laser beam instrument may project one or more beams of light.

The system consists of a hand-carryable self-leveling laser instrument of relatively wide self-leveling range (to about 4 degrees) and a turntable whose rotation is controlled by a target detection system within the turntable housing. Such a self-leveling laser instrument is manufactured by the assignee of this invention. The detection system directs the turntable by using an auxiliary rotating laser beam to home in on a special retro-reflective target held or positioned by the operator. This allows the operator to stand near the projected spot and page or call the level beam to his location using a special target. In this way he may conveniently mark points on a wall or other building element to indicate a horizontal reference plane without having to go back and forth to the laser instrument. The target is small enough to be carried conveniently in the operator's pocket.

In one case, in which the self-leveling laser instrument projects two beams of light at 90 degrees to each other, the operator can finely position one of the beams on a reference point by standing near the point and observing the laser spot at close range. The target is moved back and forth to direct the level beam to the desired point. When the beam is on the desired location, the target is withdrawn in a direction which does not disturb the position on the beam along the level plane. Since the second beam is maintained at 90 degrees to the first, the second point forms a 90 degree corner, which is easily located.

The flexibility of the laser instrument is greatly improved by making the turntable detachable from the self-leveling laser instrument. The basic laser instrument is small and can be carried on the belt or in a pocket. It is capable of many measurement tasks by itself. When the remote pointing feature is needed, the remote controlled turntable can be simply attached to the self-leveling laser instrument. The operator can then move around the job site using the target to move the beam and a pencil to mark points in a level plane observing the visible spot.

The turntable remote control is accomplished by using the plumb beam of a laser instrument manufactured by the assignee of this invention as a communication means between the target and the turntable controls. Such a laser instrument provides simultaneous level and plumb beams. When the level beam is used to mark level, the plumb beam is available for communication. A rotating pentaprism directs the plumb beam approximately 300 degrees about the job site. The plumb beam forms a plane which is approximately level and near the level beam. The plane generated by the rotating plumb beam may not be accurate enough to be used as a level reference plane. If the pentaprism is accurate and the axis of the pentaprism is vertical within 20 minutes of arc, the horizontal plane generated by the rotating beams is accurate enough to use as a measurement reference should that be needed for auxiliary measurement with an electronic detector. However, angles of several degrees are permissible for the primary procedures envisioned by the invention, wherein the scanned rotating beam is not used as a level reference plane. The invention has the versatility of being useful in providing a level reference plane when needed, in addition to one or more pointing beams, provided the tool is more accurately leveled. The moving beam of the level reference plane will normally require the use of a detector since it will not be easily visible.

When the rotating beam strikes the target, some reflected light is directed back along the same path traveled by the outgoing beam. Lenses and mirrors near the outgoing beam direct the return beam to a detector in the turntable assembly. Therefore the detected return light communicates the angle of the target relative to the turntable housing assembly by reference to the pentaprism position where the return light is detected. This information includes the direction in which the turntable must rotate to align the target reflection with the level beam. In a preferred implementation a semicircular disk on the pentaprism platform and an optical interrupt switch provide the angle and direction reference for the scanning beam rotation. For example, the arrangement can be such that if the return pulse is received when the optical switch is high, the turntable should be driven clockwise; and if the return pulse is received when the optical switch is low, the turntable should be driven counterclockwise.

It is therefore among the objectives of the invention to provide for efficient use of a self-leveling laser tool in construction layout procedures through the use of a remote controlled turntable for convenient one-man operation in marking elevation points at a construction site. These and other objects, advantages and features of the invention will be apparent from the following description of a preferred embodiment considered along with the accompanying drawings.

DESCRIPTION OF PREFERRED EMBODIMENTS

In a preferred embodiment the system of the invention comprises three elements, a self-leveling laser beam projector, a turntable module and a cooperating reflector. The laser instrument may be similar to the model LeveLite SLX manufactured by LeveLite Technology and described in U.S. Pat. No. 5,459,932. It simultaneously projects two beams of laser light, one level and one plumb, and has many useful capabilities beyond those described in the patent. The second element, the turntable module, houses the turntable, scanning optics, receiving optics, motor controls and batteries. The third element is a retro-reflector which is a sheet of retro-reflector material capable of reflecting a high percentage of the incident light back at the light source without precise aiming. Sheet material of this type is manufactured by 3M Company under the name Reflectolite.

Figure 1:
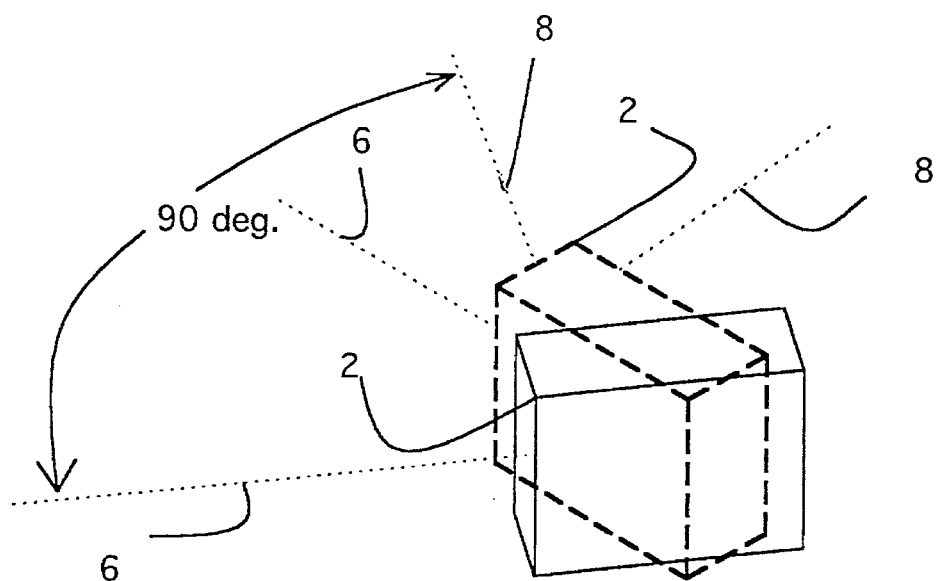
FIG. 1 is a perspective drawing of a self-leveling laser instrument projecting two beams of light in two orientations, in accordance with prior art.
Figure 2:
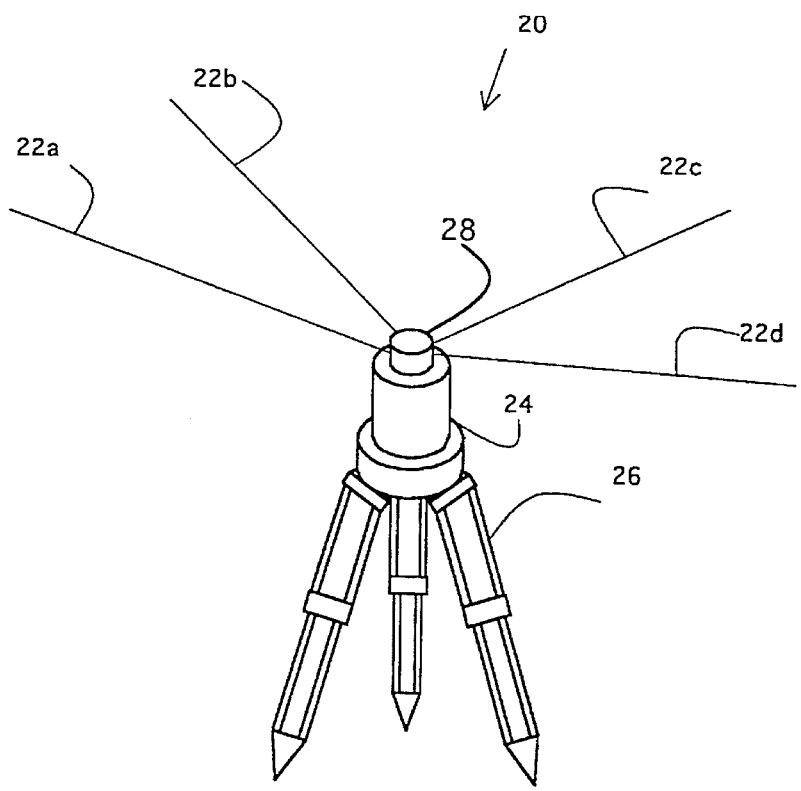
FIG. 2 is a perspective view of a prior art self-leveling laser instrument designed to project a plane of light by rotating a pentaprism.
Figure 3:
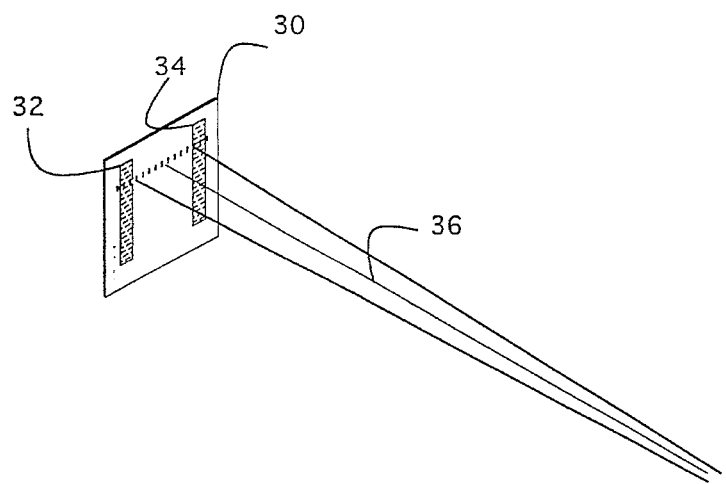
FIG. 3 shows in perspective a special target with two reflective areas used to reverse the direction of a rotation laser to enhance its visibility.
Figure 4:
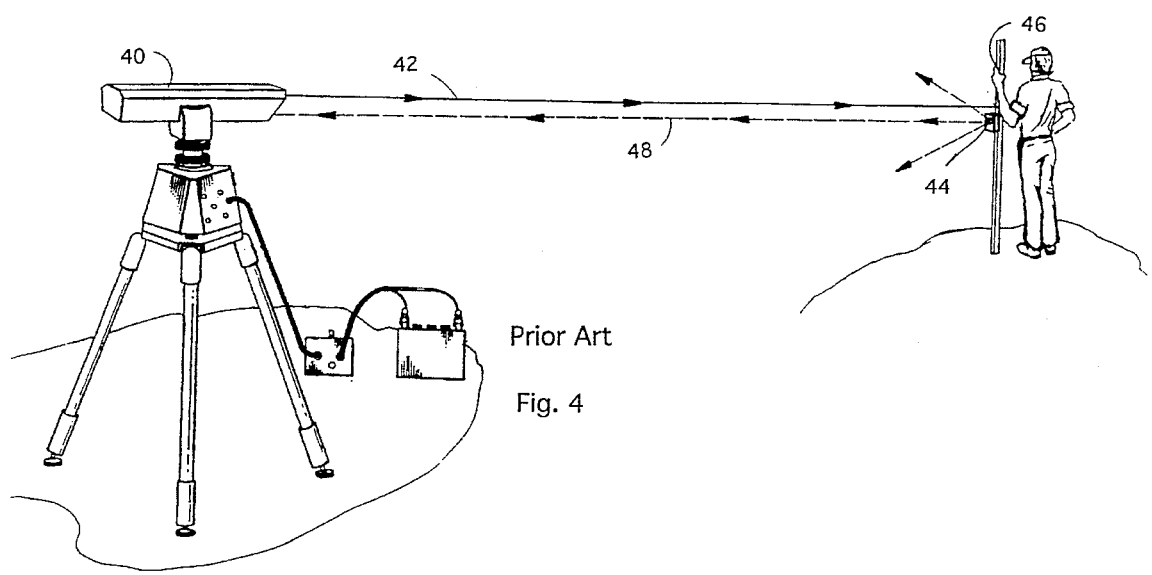
FIG. 4 is a perspective drawing showing a rotating laser instrument with a directional receiver used to point the laser instrument at the target in accordance with prior art.
Figure 5:
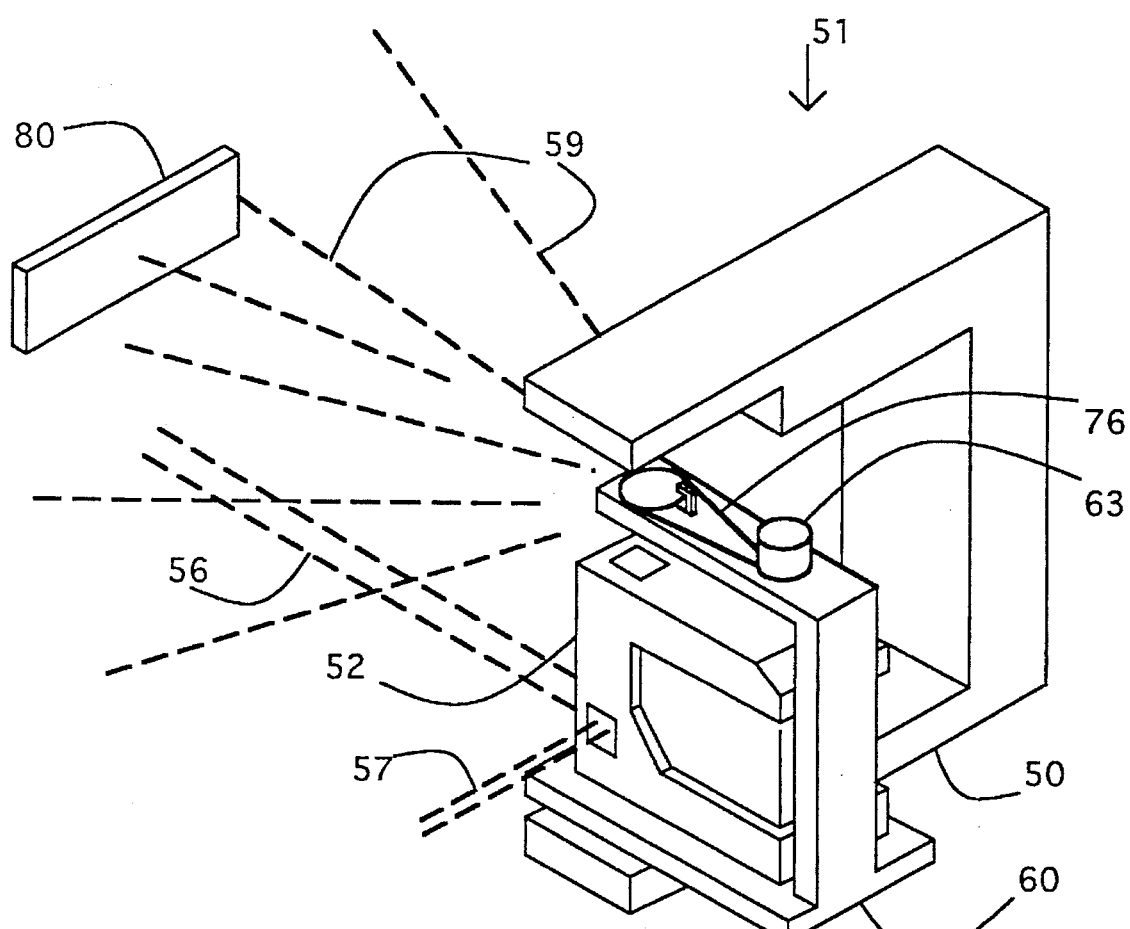
FIG. 5 is a perspective view of the invention showing a turntable assembly, projected level measurement beams and a projected scanning beam.

In the figures described below, like numbers correspond to like elements. In FIG. 5 turntable housing 50 of a turntable module or assembly 51 supports a self-leveling laser instrument 52, on a turntable 60 to which the instrument is mechanically registered, such that the laser points in a known direction relative to the turntable 60. The turntable 60 is rotatable relative to the housing 50, and is shown generally at a right-angle position in FIG. 5. A measurement beam 56 is used by the operator and may or may not strike the reflecting target 80. Another laser beam 57 generated by the instrument 52 is at 90 degrees to the measurement beam 56 and may or may not be present depending on the application. A scanning light beam 59 from the module 51 (explained further below) strikes the target 80 and gives rise to reflected light, not shown in FIG. 5. In general mounting provisions are provided to clamp the turntable housing 50 to some building element. In some outdoor applications it may be attractive to mount the turntable housing on a tripod, or in some cases simply to lay the assembly on a stable flat surface.

Figure 6A:
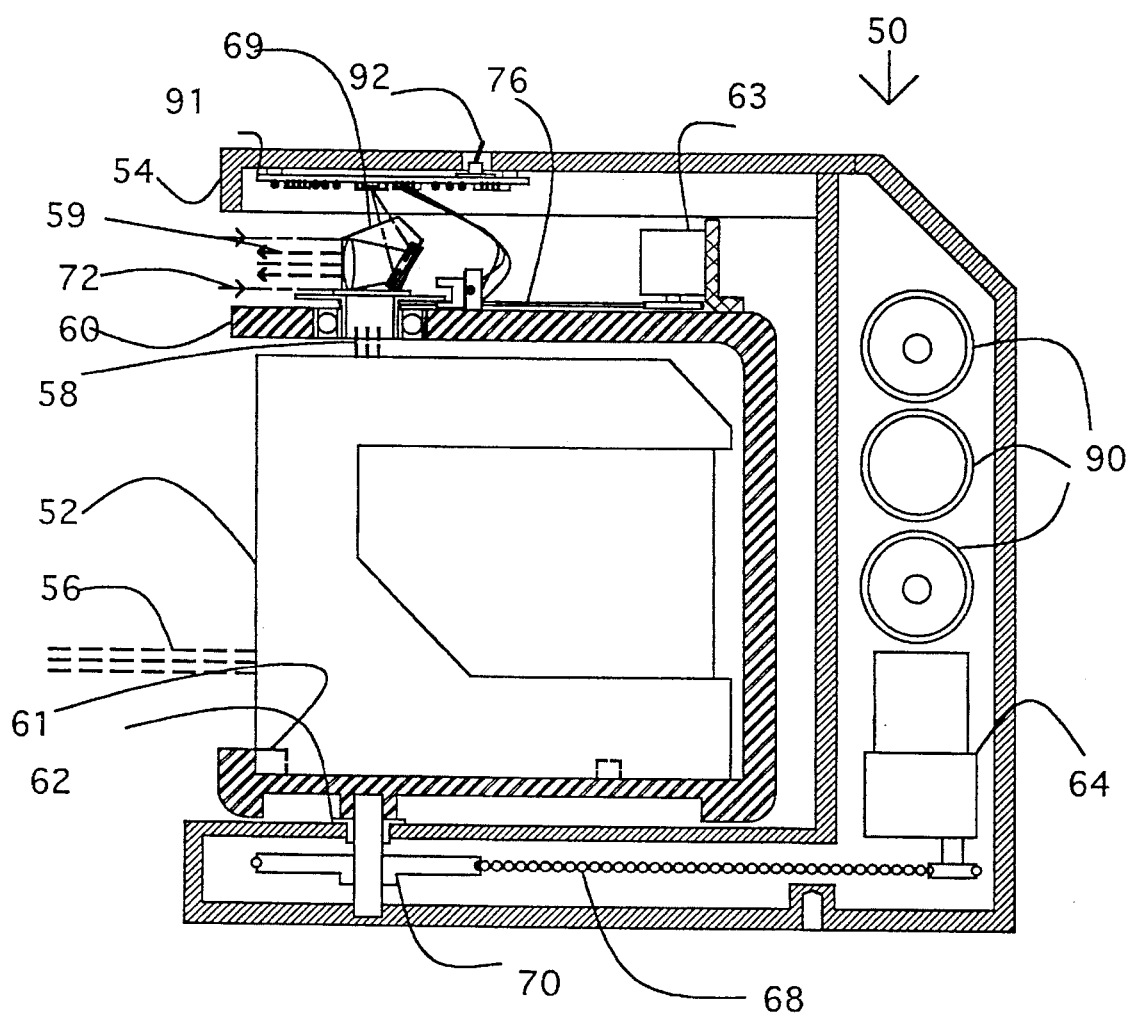
FIG. 6A is a section view of the invention showing internal details.
Figure 6:
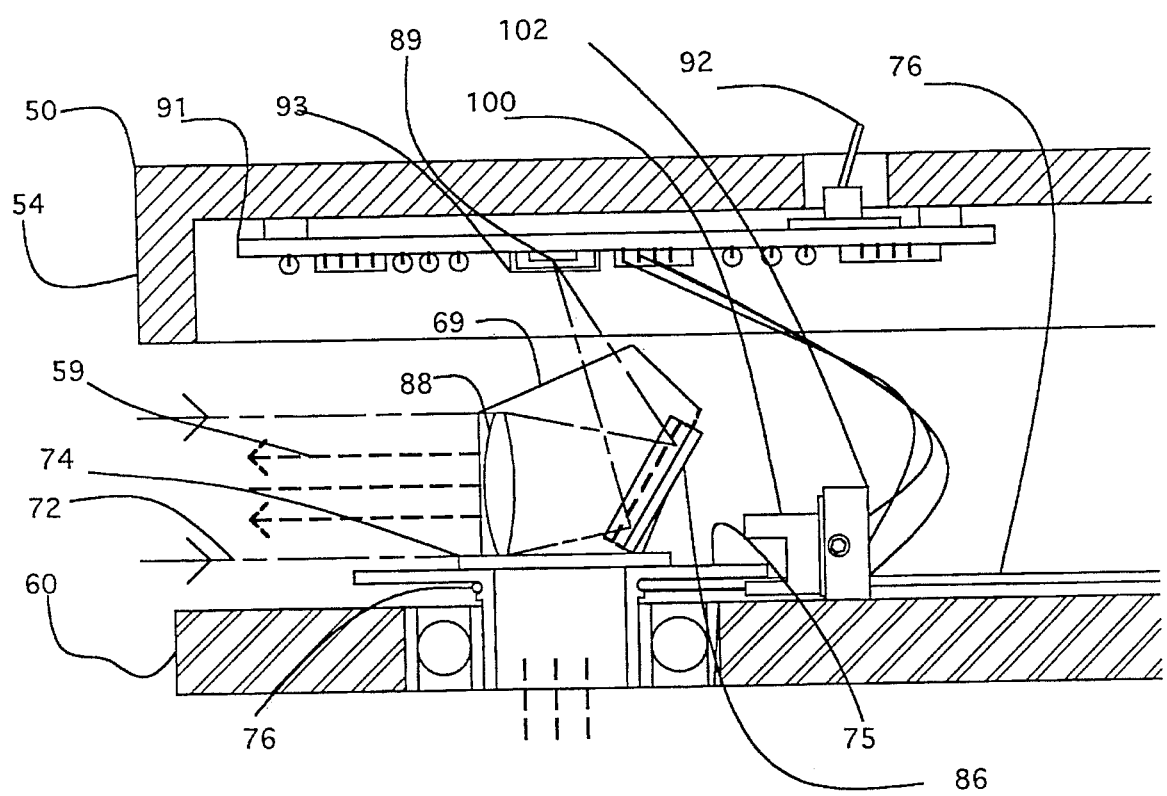
FIG. 6B is an enlarged view of a portion of FIG. 6A.

Detailed construction of the turntable assembly is shown in FIG. 6A. The laser instrument 52 is mounted on the turntable 60, which is rotatably mounted on the housing 50 (the housing and turntable are shown generally aligned in this view). The instrument produces a self-leveled laser beam 56 and a self-plumbed beam 58. The turntable housing produces the scanning beam 59 from the instrument's plumb beam 58 and collects a return beam 72 along the same path. The laser instrument 52 is secured to the turntable 60 using registration points 61 on both elements. If desired a mechanical screw adjustment (not shown) can be provided to adjust alignment of the beam 56 relative to the turntable 60, by shifting the position of the instrument 52 on the turntable, as to rotation and also translation, if needed. A bearing 62 provides for turntable rotation, effected by a gear motor 64 driving a chain 68 which powers a pulley 70 in rotation without slippage. Battery cells 90 in the housing 50 power a circuit board 91 which carries a power switch 92.

FIG. 6B is an enlarged detail view of a part of FIG. 6A and should be referred to along with FIGS. 5 and 6A. The turntable 60 and turntable housing 50, which have relative rotation, support the internal parts. A pentaprism 69 is supported on an optics platform 74 which is fastened to a combination encoder disk and drive pulley 75. An O-ring drive belt 76 connects a DC motor 63 (FIGS. 5 and 6A), which may be mounted on the turntable as shown, to the pulley/encoder 75 for rotation. The scanning light beam 59 generated from the plumb beam is scanned approximately 300 degrees by the rotation of the pentaprism 69. When the light strikes a retroreflector 80 (FIG. 5) not shown in this figure, a portion of the light 72 travels back to the system. Two lenses 88 collect the light, which is reflected by mirrors 86 onto a detector 89 on the housing 50. In this side view only one lens and one mirror are visible. A red filter 93 eliminates unwanted background light. The electrical signal from the detector 89 is amplified and processed in the circuit board 91. An optical interrupt switch 100 is mounted on a mechanical slide 102, for reading the optical encoder disc 75, as explained further below.

Figure 7A:
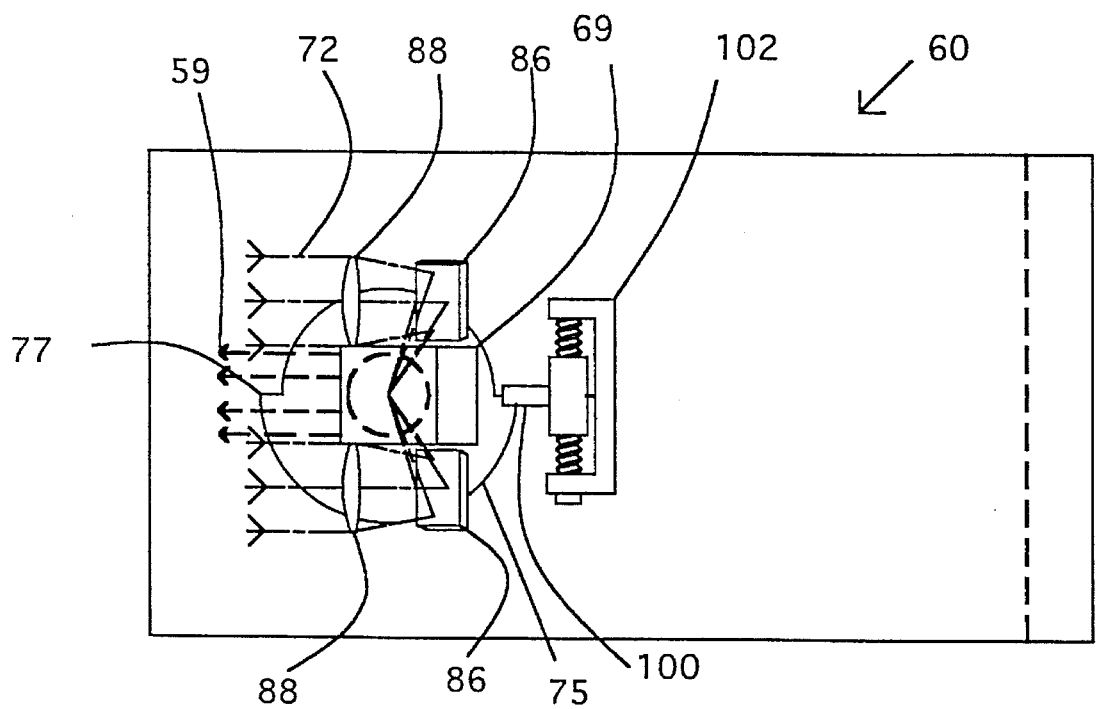
FIG. 7A is top view of the turntable assembly showing scanning and collecting optics including a rotating pentaprism which projects the scanning beam.

FIG. 7A is a top view of the turntable 60 showing how the return light 72 is collected by the two symmetric lenses 88 and reflected by symmetric mirrors 86 onto the detector, not shown. The encoder disk 75 constantly rotates so as to provide a signal to the optical interrupt 100 which is finely positioned by the mechanical slide 102 (shown as a worm gear). In this position of the encoder disk 75 its blade or extending edge 77 is centered on the optical interrupt 100, which can nominally represent the direction of the measurement laser beam 56. The outgoing light beam 59 is also shown.

Figure 7B:
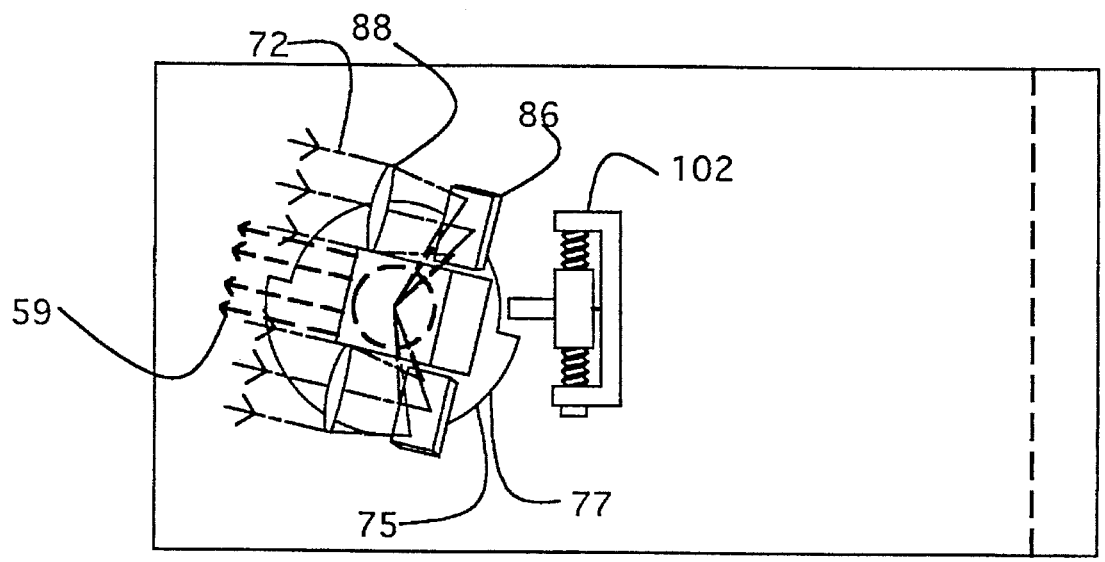
FIG. 7B is top view of the pentaprism and a rotation detection encoder disk (also seen in FIG. 7A), with the beam pointed clockwise.

In the instantaneous view of FIG. 7B the pentaprism platform and encoder disc 75 are rotated clockwise relative to FIG. 7A (the disc 75 and pentaprism are always in rotation). In this case the optical interrupt is high, the light is uninterrupted, and clockwise rotation of the turntable is required if the return light is sensed at this position.

Figure 8:
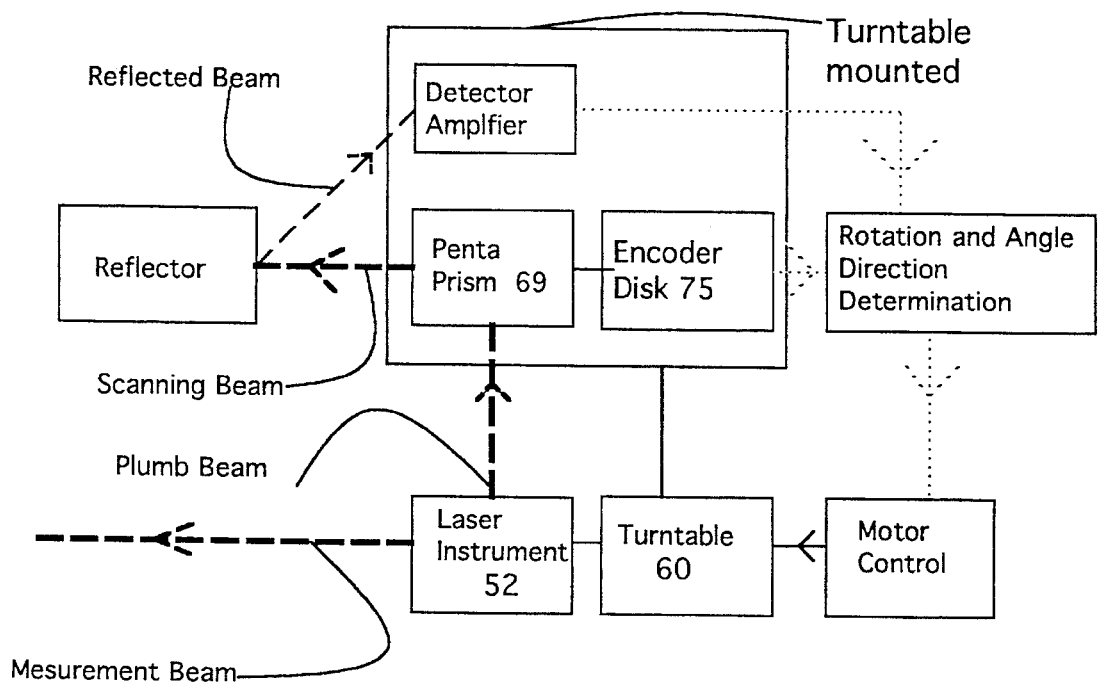
FIG. 8 is a block diagram showing interaction between elements.

The interdependence of elements is shown again in FIG. 8 for clarity. Dashed lines in FIG. 8 correspond to light beams and the solid lines correspond to a mechanical connection. The dotted lines correspond to electrical connections. The laser instrument produces both the measurement beam and the scanning beam, as indicated. The pentaprism rotation scans the plumb beam and provides a signal indicating the pentaprism orientation relative to the axis of the turntable housing, via the encoder disc 75 indicated in FIG. 8. The angle is determined in the time domain, i.e. the time difference between the detection of return light and the optical interrupt shifting its high/low status. The detector-amplifier indicated in FIG. 8 receives and amplifies an electrical pulse generated by the retroreflector. If the pulse arrives when the encoder signal is high, clockwise motor rotation is called for and vice versa. The pentaprism continues to rotate during repositioning of the turntable (which may be, e.g., at about 10 rps), repeatedly updating the angle information until the difference angle goes to zero.

Those skilled in the art will understand that this is an active servo system requiring considerations of gain, phase shift, signal-to-noise, dead band, etc. To enhance the performance of the servo system, the gain of the servo can be controlled by the angle between the optical interrupt and the return signal, and in fact this is the reason for angle determination; gain control allows quicker pointing of the measurement beam and avoids unwanted mechanical oscillations. A further system improvement is to use the frequency of the optical interrupt to control the rotation frequency of the scanning pentaprism and to aid in the detection of the return signal as is common in low noise systems. The use of low noise detection techniques utilizing the known frequency of the return signal is also well known in the art. The solutions to problems of such systems are available in textbooks on servo analysis and low noise detection.

It should also be noted that precise registration between the axis of the pentaprism, the encoder wheel, and the axis of the measuring laser beam is required for precise pointing of the measurement beam using the target. The mechanical slide 102 provides a convenient method of adjustment of the "zero" position of the scanning beam, to the same pointing direction as the measuring beam.

Figure 9:
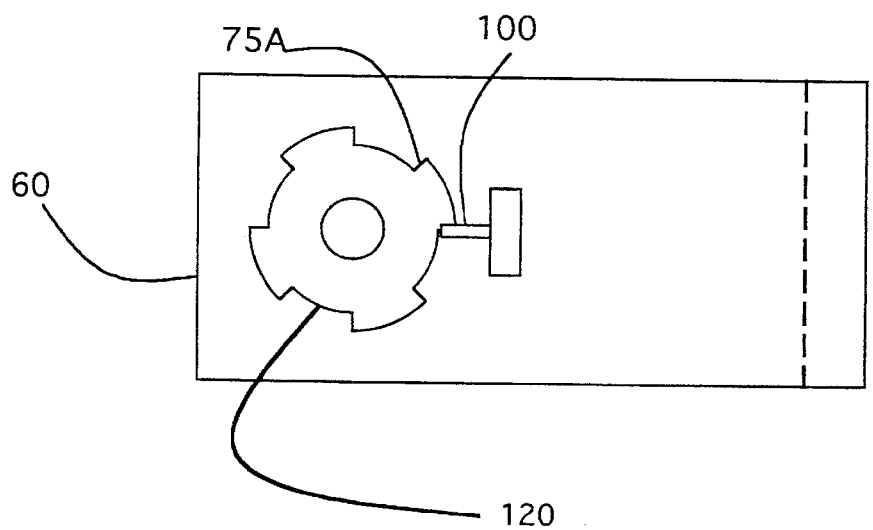
FIG. 9 is a drawing of an encoder disk used to project the level beam in four precise directions.

FIG. 9 shows an encoder wheel 120 which has four vanes which are exactly 90 degrees apart. The turntable has four stable positions which are 90 degrees apart. A switch (not shown) may be provided to disconnect the turntable motor from the servo electronics and allow for the manual pointing of the turntable to position the turntable near one of the four stable angular orientations. When the servo loop is closed by returning the switch to its normal position, the turntable moves to the next of the four stable positions. Those skilled in the art will be able to extend the number of stable angular positions of the turntable.

Those skilled in the art will also realize that the hand carryable laser instrument could be a permanent part of the turntable housing without affecting the operation of the system for the application described. In addition there are several mechanical configurations which could be used to achieve the same objectives. For example, a downwardly directed plumb beam could generate a plane of light, with all scanning optics, detectors, etc. located below the instrument rather than above. What is shown in FIG. 6A is still illustrative of such an arrangement but the embodiment of FIG. 6A would be essentially inverted. Another variation is to mount the scanning motor on the housing instead of the turntable. These and other configurations will be apparent to skilled persons.

The present invention has been described in terms of preferred and other embodiments. The present invention, however, is not limited to those embodiments described and depicted. Rather, the invention is defined by the appended claims.

I claim:

1. A system for use in layout of points or lines using a projected laser beam, comprising:

a hand carryable laser instrument having an instrument housing and means for projecting at least one substantially horizontal light beam, a remote controlled turntable unit independent and separate from the laser instrument and having a turntable, turntable rotating means and means on the turntable for receiving the laser instrument in a position of registry with the turntable such that the horizontal light beam points in a known direction relative to the turntable, means in the turntable unit for producing a generally horizontal laser scanning beam, cooperative reflective target means used to communicate from a remote position to the turntable unit by creating a reflection of the scanning beam which is returned to the turntable unit, direction indicating means in the turntable unit for using said reflection to determine a direction of rotation of the turntable needed to point the horizontal light beam toward the reflective target means, and means for rotating the turntable in accordance with said determination.

2. The system of claim 1, wherein the laser instrument is self-leveling.

3. The system of claim 1 wherein the laser instrument is a two-axis self-leveling laser instrument generating a substantially plumb light beam as well as said substantially horizontal light beam, and including means for generating said laser scanning beam from the plumb beam of the laser instrument.

4. The system of claim 3, wherein the means for generating the laser scanning beam includes a rotating pentaprism mounted on the turntable unit and positioned to receive the generally plumb light beam and to reflect the plumb light beam to form the laser scanning beam.

5. The system of claim 4, wherein the direction indicating means comprises an optical encoder disk mounted for rotation with the rotating pentaprism, and an optical interrupt switch on the turntable unit positioned to read the optical encoder disk as it rotates.

6. The system of claim 5, further including fine adjustment means between the optical encoder disk and the optical interrupt switch.

7. The system of claim 4, wherein the direction indicating means in the turntable unit includes at least one lens and a mirror, the lens and mirror rotating with the pentaprism, and a photodetector mounted on the turntable unit, the lens and mirror being positioned to receive said reflection and to focus the reflection on the photodetector thereby to establish a rotational position of the pentaprism at which the reflection is detected.

8. The system of claim 7, wherein the direction indicating means comprises an optical encoder disk mounted for rotation with the rotating pentaprism, and an optical interrupt switch on the turntable unit positioned to read the optical encoder disk as it rotates.

9. The system of claim 1, further including fine mechanical adjustment means for adjusting the position of the laser instrument on the turntable, to achieve precise aiming of the horizontal light beam relative to the turntable.

10. The system of claim 1, wherein said means for rotating the turntable comprises a gear motor.

11. A system for use in layout of points or lines using at least one projected laser beam, comprising:

a hand carryable self-leveling laser instrument having an instrument housing and means for projecting at least one substantially horizontal laser beam in spite of a small tilt of the housing, a remotely controlled turntable unit independent and separate from the laser instrument and having a turntable unit housing, a turntable located in the turntable unit housing, motor means for rotating the turntable relative to the housing, and means for securing the laser instrument on the turntable, laser scanner means in the turntable unit housing for scanning a beam in a scanned plane near the horizontal beam, cooperative reflecting means used from a remote position to return reflected light from the scanned plane back toward the turntable unit housing, optical detection means in the turntable unit housing for receiving said reflected light, scan angle determining means within the turntable housing, for determining an angle from which the reflected light was returned, relative to the turntable unit housing, including electronic detection means to receive the reflected light and to produce an amplified signal from the reflected light, and electronic determination means for determining the needed turntable rotation to point the horizontal laser beam toward the cooperative reflecting means from which the reflected light originates, and electronic means for activating said motor means to rotate the turntable to a position of pointing the horizontal laser beam toward the cooperative reflecting means in accordance with said electronic determination means, whereby an operator can call or page the horizontal laser beam to his location using the cooperative reflecting means.

12. The system of claim 11, wherein the self-leveling laser instrument includes means for projecting two substantially horizontal beams at right angles to each other.

13. The system of claim 11, wherein the motor means comprises a DC motor with speed reduction means.

14. The system of claim 11, wherein the laser scanner means comprises a rotating pentaprism and scan motor means driving the rotating pentaprism.

15. The system of claim 14, wherein the scan angle determining means comprises an encoder disk on a common axis with and rotatable with the rotating pentaprism, and an optical interrupt switch positioned to read the encoder disk.

16. The system of claim 15, wherein the encoder disk has multiple optical reading edges providing multiple pointing angles around a rotational axis of the turntable.

17. The system of claim 11, wherein the cooperative reflecting means comprises a retroreflective material.

18. The system of claim 11, wherein the cooperative reflecting material comprises an array of cube corner reflectors.

19. The system of claim 11, wherein the optical detection means comprises at least one lens and at least one mirror imaging a far field spot from the scanning beam as received from the cooperative reflecting means.

20. The system of claim 15, further including fine mechanical adjustment means connected to the optical interrupt switch, for fine adjustment of the rotational position at which the optical interrupt switch reads a "zero" position from the encoder disk.

21. The system of claim 15, wherein the optical interrupt switch produces an AC signal by interaction with the continually rotating encoder disk, and including electronic means for using said AC signal to control the frequency of scanning using the pentaprism.

22. The system of claim 11, wherein said electronic determination means includes an active servo loop driving the turntable and having a gain, and including means for reducing the gain as the angle between the horizontal laser beam and the cooperative reflecting means approaches zero.

23. The system of claim 11, wherein the laser instrument has means for generating a substantially plumb laser beam as well as said substantially horizontal laser beam, and including means for generating said laser scanning beam from the plumb beam of the instrument, said laser scanner means comprising a rotating pentaprism positioned to receive the plumb beam and scan motor means driving the rotating pentaprism, to produce the laser scanning beam.

24. The system of claim 23, wherein the substantially plumb laser beam is downwardly directed.

* * * * *